United States Patent
Chang et al.

(10) Patent No.: US 10,545,911 B2
(45) Date of Patent: *Jan. 28, 2020

(54) FORMAT MANAGEMENT FOR A CONTENT REPOSITORY

(71) Applicant: International Business Machines Corporation, Armonk, NY (US)

(72) Inventors: Yu Fen Chang, Beijing (CN); Peng Hui Jiang, Beijing (CN); Dong Rui Li, Beijing (CN); Lin Sun, Beijing (CN); Li Xiang, Beijing (CN); Ting Xie, Beijing (CN); Yuan Lin Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,884

(22) Filed: Apr. 24, 2019

(65) Prior Publication Data

US 2019/0251059 A1 Aug. 15, 2019

Related U.S. Application Data

(63) Continuation of application No. 15/428,412, filed on Feb. 9, 2017.

(51) Int. Cl.
 *G06F 16/11* (2019.01)
 *G06F 21/57* (2013.01)
 (Continued)

(52) U.S. Cl.
 CPC .......... *G06F 16/116* (2019.01); *G06F 16/122* (2019.01); *G06F 16/13* (2019.01);
 (Continued)

(58) Field of Classification Search
 USPC ....................................................... 707/756
 See application file for complete search history.

(56) References Cited

U.S. PATENT DOCUMENTS

| 5,485,601 A | 1/1996 | Ching |
| 6,026,413 A | 2/2000 | Challenger |
| (Continued) | | |

FOREIGN PATENT DOCUMENTS

WO 2015196394 A1 12/2015

OTHER PUBLICATIONS

Accelerated Examination Support Document, U.S. Appl. No. 15/898,959, dated Dec. 20, 2017, 15 pages.
(Continued)

*Primary Examiner* — Cam Linh T Nguyen
(74) *Attorney, Agent, or Firm* — Nicholas D. Bowman

(57) ABSTRACT

A computing system performs file conversion upon format expiration. A computing system evaluates a risk of expiration of a first format associated with a first format object. The computing system determines if the risk of expiration is above a threshold. The computing system identifies in response to determining the risk of expiration is above the threshold, one or more files stored in the first format for conversion. The computing system converts one or more files stored in the first format to a second format. The computing system saves the one or more files in the second format.

1 Claim, 8 Drawing Sheets

(51) Int. Cl.
   *G06F 16/13*    (2019.01)
   *G06F 16/25*    (2019.01)
   *G06F 21/62*    (2013.01)

(52) U.S. Cl.
   CPC ............ *G06F 16/252* (2019.01); *G06F 21/57* (2013.01); *G06F 21/6218* (2013.01)

(56) References Cited

U.S. PATENT DOCUMENTS

| | | |
|---|---|---|
| 6,216,212 B1 | 4/2001 | Challenger |
| 6,327,584 B1 | 12/2001 | Xian |
| 6,618,751 B1 | 9/2003 | Challenger |
| 6,745,176 B2 | 6/2004 | Probert |
| 7,523,144 B2 | 4/2009 | Chidiac |
| 7,890,509 B1 * | 2/2011 | Pearcy ................... G06Q 10/06 707/736 |
| 8,209,304 B2 | 6/2012 | Petri |
| 8,375,290 B1 | 2/2013 | Chan |
| 8,554,738 B2 * | 10/2013 | Marshall ............... G06F 16/116 707/661 |
| 8,745,084 B2 | 6/2014 | Sappey |
| 9,092,494 B1 | 7/2015 | Grim, III |
| 9,189,484 B1 | 11/2015 | Velummylum |
| 9,360,853 B2 | 6/2016 | Kiffmeier |
| 9,454,620 B2 | 9/2016 | Sabbouh |
| 9,934,244 B2 | 4/2018 | Kreiner |
| 10,140,267 B1 * | 11/2018 | Gupta ................... G06F 16/122 |
| 10,216,743 B2 | 2/2019 | Chang |
| 2002/0143794 A1 | 10/2002 | Helt |
| 2008/0034003 A1 | 2/2008 | Stakutis |
| 2009/0024558 A1 | 1/2009 | Brethauer |
| 2010/0241615 A1 | 9/2010 | Marshall |
| 2012/0331293 A1 | 12/2012 | Ma |
| 2014/0006350 A1 | 1/2014 | Fukui |
| 2016/0267104 A1 | 9/2016 | Clark |
| 2017/0094290 A1 | 3/2017 | Yuen |
| 2017/0132707 A1 | 5/2017 | Meakem |
| 2018/0225294 A1 | 8/2018 | Chang |

OTHER PUBLICATIONS

Accelerated Examination Support Document, U.S. Appl. No. 16/392,921, dated Mar. 21, 2019, 15 pages.

Chang, et al., "Format Management for a Content Repository", U.S. Appl. No. 16/392,921, filed Apr. 24, 2019.

List of IBM Patents or Patent Applications Treated as Related, Apr. 22, 2019, 2 pages.

* cited by examiner

| File ID | File Name | Author | ... | Contained Files | Rendition |
|---|---|---|---|---|---|
| 1111 | File1.doc | Steven | | File1.doc | File1.docx |
| 2222 | File2.doc | Charlie | | File2.doc | File2.docx |
| 3333 | File3.bmp | Mary | | File3.bmp | |
| 4444 | File4.example | Dave | | File4.example | |
| 5555 | Archive1.zip | John | | File5.pcx<br>File6.dwg<br>File7.dgn | |
| ... | | | ... | | ... |

FIG. 3

| Format ID | Format Name | Version | Expiration | ... | Profile | Library | REST Service |
|---|---|---|---|---|---|---|---|
| F001 | .doc | 2007 | 10/1/2015 | | MSDoc.xml | | |
| F002 | .bmp | 1 | 10/1/2025 | | | AnalyzeBMP.dll | |
| F003 | .txt | 1 | 1/1/9999 | | Text.xml | | |
| F004 | .example | 3.201 | 7/1/2051 | | | | http://abc.com/jaxrs/convert |
| F005 | .pcx | 1 | 12/31/2020 | | MSPCX.xml | | |
| F006 | .dwg | 3 | 3/1/2022 | | | analyzeDWG.dll | |
| F007 | .dgn | 4.5 | 1/1/9999 | | DGN.xml | | |
| F008 | .zip | 1 | 1/1/9999 | | Zip.xml | | |
| F009 | .docx | 2015 | 1/1/9999 | | MSDocx.xml | | |
| ... | | | | | | | ... |

FORMAT MANAGEMENT FOR A CONTENT REPOSITORY

BACKGROUND

The present disclosure relates to content repositories, and more specifically, to managing the format of the files contained therein to prevent files from becoming unusable as their formats become unsupported.

Content repositories can hold numerous files, especially as storage media becomes cheaper and technology advances. Files in these content repositories can be stored in various file formats. As the files age, older file formats can become outdated or obsolete. As a result, files stored in certain file formats may not be supported by modern programs and over time can become difficult or impossible to access.

SUMMARY

Disclosed herein are embodiments of a method and computer program product for file conversion upon format expiration. A computing system evaluates a risk of expiration of a first format associated with a first format object. The computing system determines if the risk of expiration is above a threshold. The computing system identifies in response to determining the risk of expiration is above the threshold, one or more files stored in the first format for conversion. The computing system converts one or more files stored in the first format to a second format. The computing system saves the one or more files in the second format.

Also disclosed herein are embodiments of a system for file conversion upon format expiration. One or more processors located within a computing system, and in communication with a memory that is also located within a computing system are configured to evaluate a risk of expiration of a first format associated with a first format object. The computing system determines if the risk of expiration is above a threshold. In response to determining the risk of expiration is above the threshold, the computing system identifies one or more files on a user device, which comprises a user interface and a plurality of files, stored in the first format for conversion. The computing system transmits, to the user device, a request to convert the one or more files. In response to a confirmation received from the user device, the computing system receives the one or more files from the user device to the memory. In response to receiving the one or more files, the computing system converts the one or more files stored in the first format to a second format. The computing system transmits, to the user device, the one or more files in the second format. The computing system transmits, to the user device, an indication, to be displayed on the user interface of the user device, that the one or more files were successfully converted.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 depicts an example file objects table in accordance with some embodiments of the present disclosure.

FIG. 4 depicts an example format objects table in accordance with some embodiments of the present disclosure.

Figure 1:
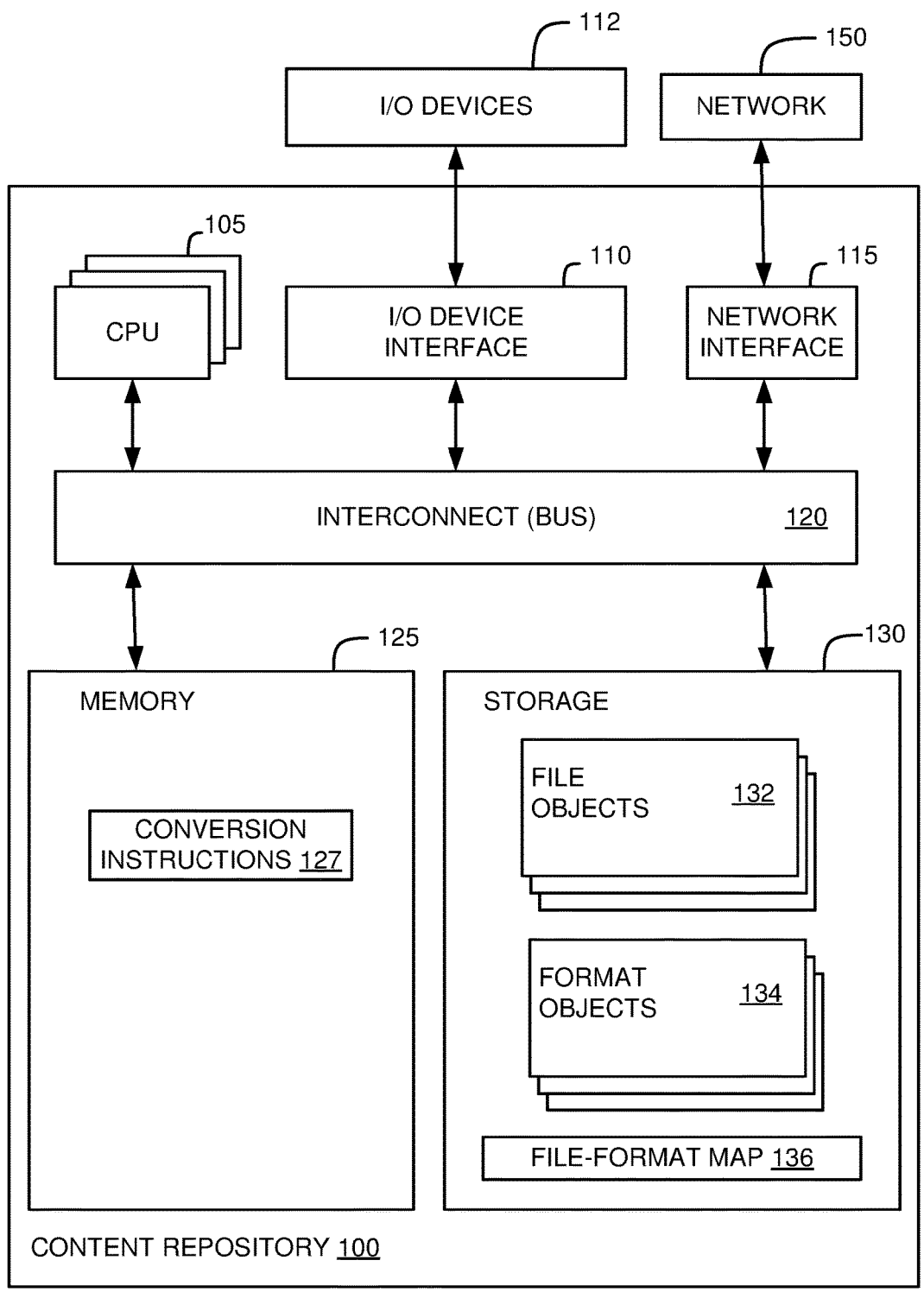
FIG. 1 illustrates a block diagram of a content repository in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to content repositories, more particular aspects relate to managing the format of the files contained therein to prevent files from becoming unusable as their formats become unsupported. While the present disclosure is not necessarily limited to such applications, various aspects of the disclosure can be appreciated through a discussion of various examples using this context. Aspects of the present disclosure can also be used on any other computer systems which store files including, but not limited to, personal computers, smartphones, mainframes, servers, or cloud computing storage environments.

Content repositories can hold numerous files, especially as storage media becomes cheaper and technology advances. Files in these content repositories can be stored in various file formats and as the files age, older file formats can become outdated or obsolete. As a result, files stored in certain file formats may not be supported by modern programs and over time can become difficult or impossible to access without taking additional steps. Steps to maintain file accessibility can include locating a legacy program which a modern computer can use to access older file formats on an ad hoc basis when needed. Alternatively, older computers can be maintained for the special purpose of running old software to access obsolete file formats when needed.

The present disclosure provides an alternative to such steps by proactively determining when file formats are becoming outdated and determining an expiration date for file formats. Upon determination that a file format is expired, a content repository can convert existing files in that file format to another format, which is not expired, and save the file in the new format, either as a new copy or overwriting the original copy. Through this procedure, a user will be able to access files in outdated file formats with minimal effort by simply opening the replacement or alternate file saved in the new format.

This provides the advantage of preventing obsolescence of files in old file formats. Furthermore, aspects of the present disclosure do not require a user to manually access files in outdated formats through complicated techniques. These advantages are a non-exhaustive list of example advantages. Embodiments of the present disclosure exist that contain none, some, or all of the aforementioned advantages.

In order to accomplish this alternative, the present disclosure provides for a content repository which utilizes file objects which contain information about corresponding files including a file identification number (file ID), the file name, the name of the contained files, any rendered versions of the file, and other information as appropriate. The content repository also utilizes format objects which contain information about corresponding formats including a format identification number (format ID), the format name, the version of the format, an expiration date, and the name of a format profile, format library, or REST service (representational state transfer) service (also known as a RESTful service). Using these objects, a record of associations between the files and formats can be kept. Additionally, the risk of expiration of each file format is analyzed and once the content repository determines the risk of expiration of a given file format exceeds a threshold, that file format can be deemed expired. After determination of expiration, all files (or some determined subset) in that file format are converted to an alternative file format that is not expired. These converted files can be saved over the existing files, or saved as a new file, either of which can be termed a rendition or a rendered file.

Referring now to FIG. 1, illustrated is a block diagram of a content repository 100 in accordance with some embodiments of the present disclosure. In some embodiments, content repository 100 performs operations in accordance with FIGS. 6-7 as described in further detail hereinafter. The content repository 100 can include one or more processors 105 (also referred to as CPUs 105 herein), an I/O device interface 110, I/O devices 112, a network interface 115, an interconnect (e.g., BUS) 120, a memory 125, and a storage 130.

Each CPU 105 retrieves and executes programming instructions stored in the memory 125 or storage 130. The interconnect 120 is used to move data, such as programming instructions, between the CPUs 105, I/O device interface 110, network interface 115, memory 125, and storage 130. The interconnect 120 can be implemented using one or more busses. Memory 125 is generally included to be representative of a random access memory (e.g., static random access memory (SRAM), dynamic random access memory (DRAM), or Flash). In some embodiments, the memory 125 can be in the form of modules (e.g., dual in-line memory modules). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the content repository 100 via the I/O devices 112 or a network 150 via the network interface 115.

The CPUs 105 can be a single CPU, multiple CPUs, a single CPU having multiple processing cores, or multiple CPUs with one or more of them having multiple processing cores in various embodiments. In some embodiments, a processor 105 can be a digital signal processor (DSP). The CPUs 105 can additionally include one or more memory buffers or caches (not depicted) that provide temporary storage of instructions and data for the CPUs 105. The CPUs 105 can be comprised of one or more circuits configured to perform one or methods consistent with embodiments of the present disclosure.

The memory 125 of the content repository 100 includes conversion instructions 127. The conversion instructions 127 are processor-executable instructions for converting files from one format to another. In some embodiments, the conversion instructions 127 can serve as a directory pointing to the locations where each specific conversion instruction is stored, such that it can be located and used as needed, instead of holding all conversion instructions.

Storage 130 contains file objects 132, format objects 134, and a file-format map 136. File objects 132 are objects which contain data about a file, including a file identification number (file ID), the file name, the name of the contained files, any rendered versions of the file, and other information as appropriate. Additional types of data which can be stored in file objects 132 are the author of the file, the program which created the file, dates of the file's creation, modification, or access, importance of the file, size of the file, or other such information. File objects 132 are described in further detail hereinafter with respect to FIG. 3.

Format objects 134 are objects which contain data about a format, including a format identification number (format ID), the format name, the version of the format, an expiration date, and the name of a format profile, format library, or REST (representational state transfer) service (also known as a RESTful service). A format profile is a metadata set used to describe the essential information of a format, including a pointer to an application or conversion tool which can parse and extract the content of a file in that format. A format profile can take the form of an extensible markup language file (.xml file), an initialization file (.ini file), or any other kind of file capable of storing such information. A format library can be dynamic-link library file (.dll file) or compiled file for a tool which can open files in the corresponding format. A REST service is a service which can parse a file in the corresponding format and return the content and other relevant information of the file. In some embodiments, a format which is not yet expired will have no expiration date, and in other embodiments, an expiration date far in the future (e.g. the year 6000, the year 9999) can be used for formats which are not expired to imply no real expiration date. Format objects 134 are described in further detail hereinafter with respect to FIG. 4.

Figure 5:
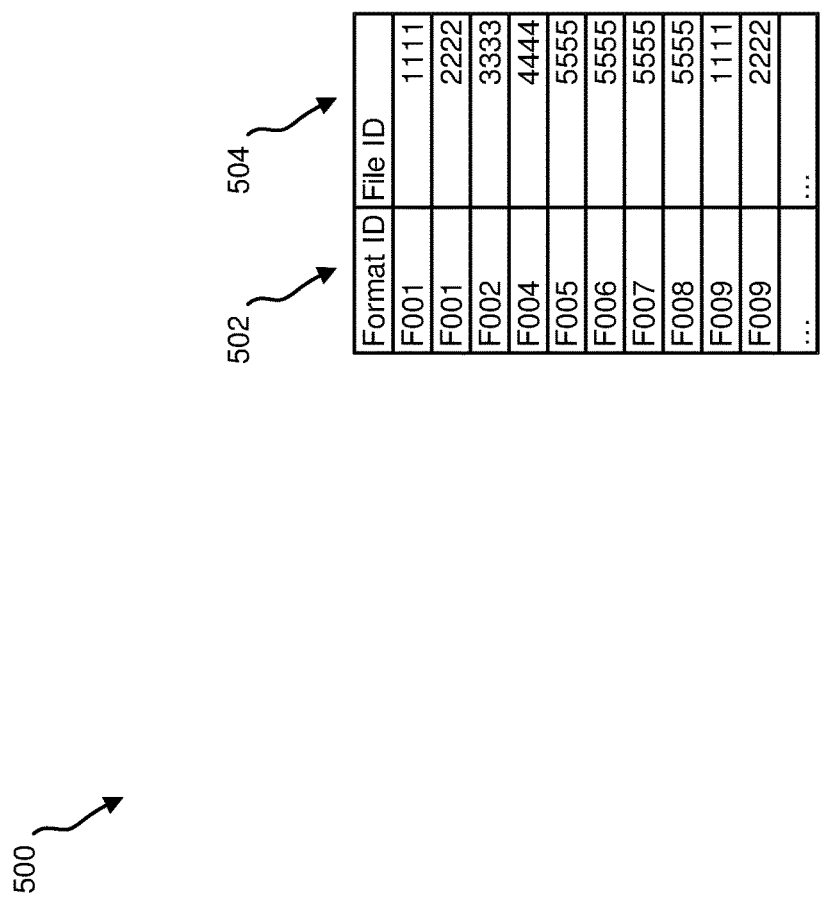
FIG. 5 depicts an example file-format map in table form in accordance with some embodiments of the present disclosure.

The file-format map 136 is a record of associations between files and formats of files. The file-format map 136 can take various forms, such as, but not limited to, a table (such as depicted in FIG. 5), a database, a list, and a group of key-value pairs. In some embodiments, every file in the content repository exists in the file-format map and is associated with the format of that file. In some embodiments, the content repository recognizes formats for which there are no files in that format, if for example all files in such format have been removed.

In some embodiments as discussed above, the memory 125 stores conversion instructions 127 and the storage 130 stores file objects 132, format objects 134, and a file-format map 136. However, in various embodiments, the conversion instructions 127, file objects 132, format objects 134, and file-format map 136 are stored partially in memory 125 and partially in storage 130, or they are stored entirely in memory 125 or entirely in storage 130, or they are accessed over a network 150 via the network interface 115.

In various embodiments, the I/O devices 112 can include an interface capable of presenting information and receiving input. For example, I/O devices 112 can receive input from a user and present information to a user interacting with content repository 100 and/or a user device (e.g., user device 202 of FIG. 2).

Figure 2:
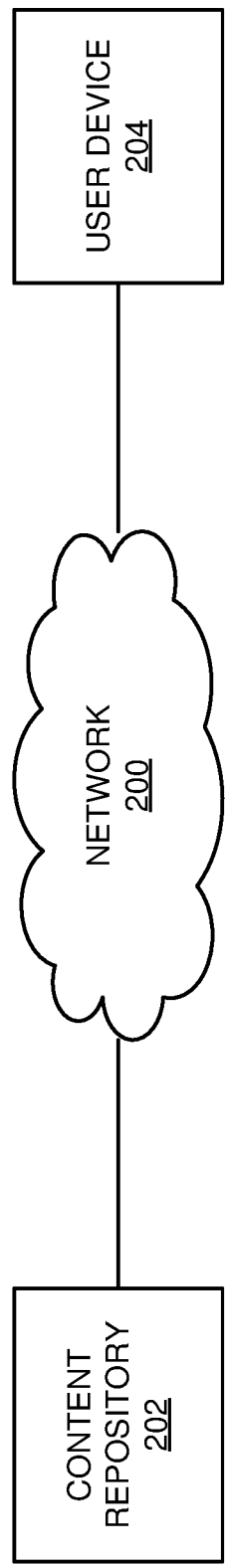
FIG. 2 illustrates a block diagram of a network in which some embodiments of the present disclosure can be implemented.

In some embodiments, the network 150 is consistent with network 200 as described with respect to FIG. 2. The network 150 can connect (via a physical or wireless connection) the content repository 100 with one or more devices (e.g., user device 202 of FIG. 2) that interacts with the content repository.

Logic modules throughout the content repository 100—including but not limited to the memory 125, the CPUs 105, and the I/O device interface 110—can communicate failures and changes to one or more components to a hypervisor or operating system (not depicted). The hypervisor or the operating system can allocate the various resources available in the content repository 100 and track the location of data in memory 125 and of processes assigned to various CPUs 105. In embodiments that combine or rearrange elements, aspects and capabilities of the logic modules can be combined or redistributed. These variations would be apparent to one skilled in the art.

FIG. 2 illustrates a block diagram of a network in which some embodiments of the present disclosure can be implemented. The network 200 communicatively couples user device 204 and content repository 202 to one another via a physical or wireless connection. In some embodiments, content repository 202 is consistent with content repository 100. User device 204 can include, but is not limited to, a mobile phone, a tablet, a laptop, a desktop computer, or a different device. User device 204 can be used by a user to access content repository 202 to perform various functions, including adding a file or files to content repository 202, accessing files stored in content repository 202, or executing commands regarding file objects, format objects, conversion instructions, or initiating a format expiration check command (described in further detail hereinafter with respect to FIG. 7).

Additionally, in some embodiments, user device 204 can access content repository 202 (or content repository 202 can access user device 204) to have the content repository perform conversion of files on the user device from an expired format to an alternate format (described in further detail hereinafter with respect to FIG. 8). Additional possible operations via network 200 include content repository 202 remotely reviewing files on user device 204, downloading files from the user device, and uploading converted files to the user device. These examples are not meant to be exhaustive and any of the operations discussed in this application which may be performed on a content repository, may be performed via network 200 and involve both a content repository and user device.

FIG. 3 depicts an example file objects table 300, with each row corresponding to a file object. Column 302 of file objects table 300 shows the file ID of the file objects. The file ID is a unique identifier for each file and can be a number, a string of characters, or some combination thereof. File IDs can be generated sequentially based upon when each file is added to the content repository, at random, or by any other methods. Column 304 of file objects table 300 shows the file names of the file objects. The file name can be a user generated string with as much or as little detail about the file as desired. In other embodiments, the file name can be the same as the file ID, or only one of these entries can be used. Column 306 of file objects table 300 shows the author of the file objects. The author entry can correspond to the user of a computer who generated the file, the computer name of the computer on which the file was generated, a user inputted author name, or other designation that identifies the source of the file. In some embodiments, file objects table 300 does not include column 306.

Column 308 of file objects table 300 illustrates that one or more additional entries can be present for respective file objects in various embodiments as appropriate for a given content repository. Examples of additional types of data which can be stored in file objects are: the program which created the file, dates of the file's creation, modification, or access, importance of the file, size of the file, location of the file in the content repository, or other such information. This list is not exhaustive and many other types of data about a file can be stored in file objects. Inclusion of additional entries in a file object can increase the ability of a content repository or a user of a content repository to customize which files to convert upon a determination of expiration or be used in evaluation of the risk of expiration, concepts more fully discussed below with regard to FIG. 7.

Column 310 of file objects table 300 shows the name of the contained files of a file. In this context, the contained files of a file means the file names of all files included within the file. In many cases a file will not contain any files besides itself and this entry will match the file name entry. However, this entry in a file object for an archive file, meaning a file containing other files, will have additional information. Common types of archive files include, but are not limited to, .zip files, .rar files, .tar files, and .z7 files. In such a situation, the name of the contained files of the file shown in column 310 will be a listing of all of files contained within the archive file. In the example of file objects table 300, file 5555 (named Archive1.zip) contains three files within it named File5.pcx, File6.dwg, and File7.dgn and these file names are stored in the name of the contained files entry of file 5555's file object.

In other embodiments, archive files can be treated differently, with the archive file being given one file ID and one file object, and each file contained within the archive having a unique file ID and file object. For example, with regard to table 300 in these embodiments, the row for file 5555 (named Archive1.zip) would instead be four separate rows—one for Archive1.zip, one for File5.pcx, one for File6.dwg, and one for File7.dgn. In some embodiments, the file IDs can use the archive file's file ID as a prefix and contain a unique suffix, such as 5555a, 5555b, and 5555c, or other methods of indicating the files are contained within an archive, while in other embodiments, the file IDs would be unrelated.

Column 312 of file objects table 300 shows any renditions of a file. This concept will be more fully explored below with regard to FIG. 7. In essence, once a file is converted from one format to another, the content repository can save a copy of the file in the second format. This copy in the second format would be a rendition of the original file and an entry in the file object for the original file would appear indicating the rendition. Alternatively, the content repository can overwrite or delete the original file and only keep the rendition file, in which case the entry in the file object for the original file would indicate the new version of the file, the rendition.

The treatment of the rendition file can vary in embodiments, with the rendition file being given its own file ID and/or file name in some embodiments, being linked to the existing file ID in other embodiments, or both. Like the contained files entry of a file object, the rendition entry can contain more than one piece of information (not depicted in table 300). This can occur if a file was originally stored in a format later determined to be expired and a first rendition was created, followed by the format of the first rendition being determined to be expired and a second rendition being created. This second rendition can be either a rendition of the first rendition or a second rendition of the original.

FIG. 4 depicts an example format objects table 400, with each row corresponding to a format object. Column 402 of format objects table 400 shows the format ID of the format objects. The format ID is a unique identifier for each format and can be a number, a string of characters, or some combination thereof. Format IDs can be generated sequentially based upon when each format is added to the content repository, at random, or by any other methods. Column 404 of format objects table 400 shows the format name of the format objects. The format name can be a user generated string with as much or as little detail about the format as desired. In other embodiments, the format name can be the same as the format ID, or only one of these entries can be used.

Column 406 of format objects table 400 shows the version of the format. A format can exist in one or more versions. In one embodiment, each version of a format would have a separate format object and files saved in that version of the format would be associated with that format object. In other embodiments, information about multiple versions of a format can be contained within one format object with potentially differing dates of expiration, format profiles, format libraries, REST services, or other information stored for each version. In another embodiment, only the latest version of a format would be included in a format object.

Column 408 of table 400 shows the expiration date of the format. In some embodiments, a format which is not yet expired will have no expiration date, and in other embodiments, an expiration date far in the future (e.g. the year 6000, the year 9999) can be used for formats which are not expired to imply no real expiration date. Once the risk of expiration of a format is determined to be above a threshold, a format is marked expired, and the date of expiration will be added to the format object, or the existing date in the format object (if any) can be changed. In some embodiments, the date of expiration will correspond to the date the risk of expiration of a format is determined to be above a threshold. In other embodiments, a content repository can estimate a date of expiration in the future. Risk of expiration is described in more detail hereinafter with respect to operation 706 of FIG. 7.

Column 410 of table 400 illustrates that one or more additional entries can be present in the format objects in various embodiments as appropriate for a given content repository. Examples of additional types of data which can be stored in format objects are: known programs which have created files in the format, the date the first file in that format was created, the date the first file in that format was added to the content repository, the date the most recent file in that format was created, the date the most recent file in that format was added to the content repository, the number of files in that format present in the content repository, and statistical information about the files in that format present in the content repository. Such statistical information can include, but is not limited to, average, median, mode, minimum, maximum, or similar values relating to file sizes of files in that format, authors of files in that format, importance values of files in that format, percentage of files in that format which are expired, or other such information. This list is not exhaustive and many other types of data about a format can be stored in format objects. Inclusion of additional entries in a format object can increase the ability of a content repository or a user of a content repository to customize which files to convert upon a determination of expiration or be used in evaluation of the risk of expiration, concepts more fully explored below with regard to FIG. 7.

Column 412 of table 400 shows the format profile of the format. A format profile is a metadata set used to describe the essential information of a format, including a pointer to an application or conversion tool which can parse and extract the content of a file in that format. A format profile can take the form of an extensible markup language file (.xml file), an initialization file (.ini file), or any other kind of file capable of storing such information. Not all format objects will have a format profile associated with the format. As such, in various embodiments, this entry can be blank if there is no associated format profile, or there can be an indication such as "N/A" or "not applicable" in the format object for associated format profile.

Column 414 of table 400 shows the format library of the format. A format library can be dynamic-link library file (.dll file) or compiled file for a tool which can open files in the corresponding format. Not all format objects will have a format library associated with the format. As such, in various embodiments, this entry can be blank if a there is no associated format library, or there can be an indication such as "N/A" or "not applicable" in the format object for associated format library.

Column 416 of table 400 shows the REST Service associated with the format. A REST (representational state transfer) service (also known as a RESTful service) is a service which can parse a file in the corresponding format and return the content and other relevant information of the file. Not all format objects will have a REST Service associated with the format. As such, in various embodiments, this entry can be blank if there is no associated REST Service, or there can be an indication such as "N/A" or "not applicable" in the format object for associated REST Service.

While entries for format profile, format library, and REST Service are each optional for a format object, each format object typically contains an entry for at least one of these. Alternatively, in some embodiments, there can be additional options besides these three. However, a format object should contain some entry, whether it be one of the three examples provided or some other, which allows a content repository to access the content of files within the format.

The information stored in the format objects, including the entries for format profile, format library, REST Service, or other alternatives can allow a content repository to create conversion instructions for conversion of files in one format to a second format. Additionally, a format object can contain an entry for, or link to, conversion instructions which can allow a content repository to convert files of a format into one or more alternate formats. Conversion instructions can comprise a relational map between formats. The relational map can correlate fields, values, and/or objects, in various embodiments. Conversion instructions can also be generated from format objects by a rules-based translation service which heuristically determines which format should be used as the basis for a conversion from an expired format.

FIG. 5 depicts an example file-format map 500 in table form. Column 502 of file-format map 500 shows the format ID of formats. Column 504 shows the file ID of files. In the example of FIG. 5, each row corresponds to an association between a format in column 502 and a file in column 504. Because of the possibility that multiple files will be present in a content repository in any given format, there can be many associations of files with any given format. In an embodiment where there is one file ID for an archive file and the archive file's contained files, there can be multiple associations of formats with any given file ID. Similarly, in an embodiment where a rendition is associated with the same file ID as the original file, there can be multiple associations of formats with any given file ID. On the other hand, in an embodiment where archive files' contained files each have their own file ID and renditions each have their own file ID separate from the original file's ID, each file ID should be associated with only one format ID.

The file-format map can take various forms, including the table shown, but a non-exhaustive list of additional options includes a database, a list, and a group of key-value pairs. In embodiments where the file-format map is a group of key-value pairs, archive files' contained files can each have their own file ID and renditions can each have their own file ID separate from the original file's ID, such that each file ID is associated with only one format ID. Thus, embodiments where the file-format map is a group of key-value pairs allows for only one value (the format ID) for each key (the file ID).

Figure 6:
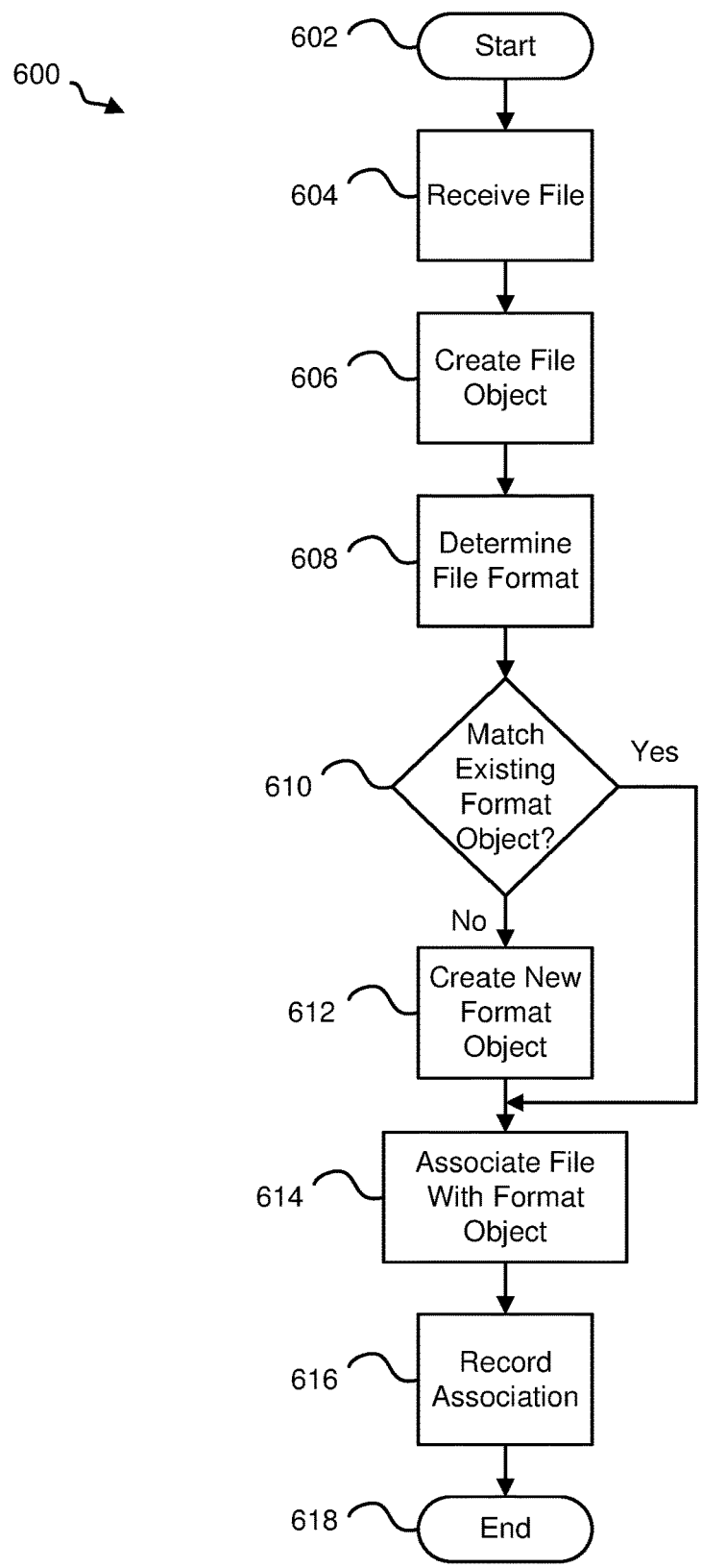
FIG. 6 depicts an example method for a content repository processing an incoming file, in accordance with embodiments of the present disclosure.

FIG. 6 depicts an example method 600 for a content repository processing an incoming file, in accordance with embodiments of the present disclosure. Method 600 can include more or less actions than those depicted. Method 600 can include actions in different orders than those depicted. Method 600 can be performed by a content repository such as depicted in FIG. 1 or FIG. 2.

From start 602, the content repository receives a file at 604. This file can be received via a local input, such as an I/O device 112, or from a network, such as network 150 or network 200. In some embodiments, before continuing with the method, the content repository can perform security or other checks on the file. For example, the content repository can verify source, verify authenticity, check for data corruption in transit, or scan for malware. In addition to individual files, the file received at 604 can be an archive file, meaning a file containing other files. Common types of archive files include, but are not limited to, .zip files, .rar files, .tar files, and .z7 files. In the case of an archive file, the remainder of method 600 would be performed once for the archive file itself, and again for each file contained within the archive. This can occur in a serial fashion, one after another, or can occur in parallel with the method being performed simultaneously on all files within the archive at once.

At 606, the content repository creates a file object. The information contained within a file object will vary in embodiments as discussed above in regards to FIG. 3. The content repository can prompt a user to enter the relevant information or can scan the contents of the file or a file's metadata information to automatically determine the relevant information. In some embodiments, a combination of these options can be used; for example, a content repository can scan the contents of the file, create a preliminary file object, and then prompt a user to make any alterations as needed for accuracy.

At 608, the content repository determines the format of the file. In various embodiments, a user can manually input the format of a file, the content repository can determine the format of a file based on the extension of the file, the content repository can determine the format of a file based on the file signature contained within the file, or the content repository can execute code to scan the file for identifying features common to a file format.

At 610, the content repository compares the format determined at 608 to the format objects contained within the content repository. The first time any file is added to a content repository, there may be no format objects to compare to and this comparison results in a determination that the format does not match an existing format object.

If the format does not match an existing format object, the content repository creates a new format object at 612. The information contained within a format object will vary in embodiments as discussed above in regards to FIG. 4. The content repository can prompt a user to enter the relevant information or can scan the contents of the file or a file's metadata information to automatically determine the relevant information. In some embodiments, a combination of these options can be used; for example, a content repository can scan the contents of the file, create a preliminary format object, and then prompt a user to make any alterations as needed for accuracy. In some embodiments, when a format object is first created, it will have no expiration date (meaning this entry can be blank or can be an arbitrary date far in the future) until the risk of expiration date is determined, unless a user manually inputs an expiration date for a format.

In some embodiments, a content repository will allow a user to create or modify a format object at times other than when a file is added to a content repository and it is determined there is no matching format object. Allowing for adding format objects at other times can allow a user to prepare a content repository in advance for addition of files, which can provide time saving or other advantages. In such embodiments, a content repository can additionally allow for modification of an existing format object when the first file in that format is added to the content repository. In other embodiments, a content repository can allow for modification of an existing format object at any time a file is added to the content repository, or can allow for modification of an existing format object at any time at all.

Once a new format object is created, or if the format did match an existing format object, the content repository associates the file with the format object at 614. In embodiments where multiple versions of formats are stored within one format object, an association between the file and the version of the format can also be made. In some embodiments, in the case of the format matching an existing format object, the content repository can check whether that format object has previously been designated expired. If it has already been marked as expired, the content repository can proceed to convert the file to an alternate format as discussed below in regards to FIG. 7, or schedule conversion for some other time.

At 616, the association from 614 is recorded within the content repository. An example of such record of association is a file-format map, such as the table shown in FIG. 5 or the alternate formats discussed above in regards to FIG. 5. Records of association can also be stored in the file objects and/or format objects. After recordation, the method ends at 618.

Figure 7:
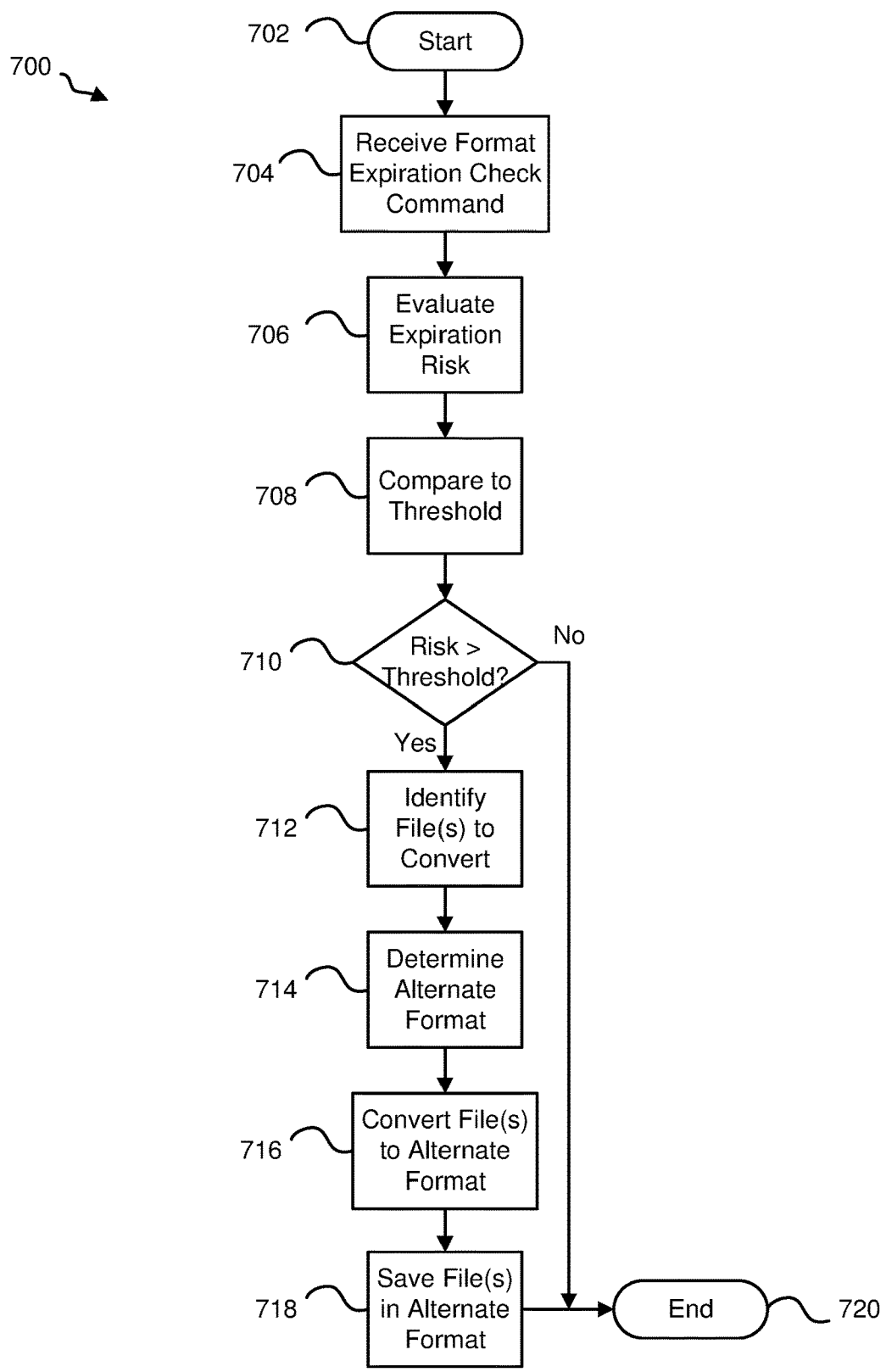
FIG. 7 depicts an example method for a content repository processing a format expiration check command and converting files to an alternate format, in accordance with embodiments of the present disclosure.

FIG. 7 depicts an example method 700 for a content repository processing a format expiration check command and converting files to an alternate format, in accordance with embodiments of the present disclosure. Method 700 can include more or less actions than those depicted. Method 700 can include actions in different orders than those depicted. Method 700 can be performed by a content repository such as depicted in FIG. 1 or FIG. 2.

From start 702, the content repository receives a format expiration check command at 704. A content repository can receive such command based upon user input requesting that a format be checked for expiration. A content repository can also receive such command on an automatic basis whether triggered by an event, such as a new format object being added to the content repository, or triggered by scheduling, such as the content repository being programed or scheduled to perform a format expiration check on a monthly basis, annual basis, or any other time schedule. Scheduling of format expiration checks can also depend on the results of one or more previous expiration checks; for example, if a format was previously determined to have a high risk of expiration, but not high enough to be above an appropriate threshold, future expiration checks can be scheduled to occur more frequently, or if a format was previously determined to have a low risk of expiration, expiration checks can be scheduled to occur less frequently. A format expiration check command can command a content repository to check the risk of expiration for a single version of a format, all versions of a format, multiple formats, or all formats in the content repository. In the event where more than one version or format is to be checked, the remainder of method 700 would be performed once for each format. This can occur in a serial fashion, one after another, or can occur in parallel with the method being performed simultaneously on all formats to be checked at once.

Once a content repository receives a format expiration check command at 704, the content repository evaluates the risk of expiration of the format at 706. This may be performed for one or more versions of a format in embodiments where multiple versions of a format exist. The process for evaluating the risk of expiration of a format will vary in embodiments. For example, in some embodiments, the risk of expiration of a format can be evaluated using the following formula: risk of expiration=(market share of the main applications that support the format)*A+(the release frequency of the applications)*B+(the number of applications that support the format)*C, where A, B, and C are coefficients which can be predefined or adjusted by users of the content repository. Many modifications to this formula can be made to tailor the formula to the particular content repository or format at issue. Some potential modifications include changing the first variable to the market share of all applications that support the format or one application that supports the format instead of the main ones, changing the second variable to the number of days (or other time period) since the last release of an application which supported the format, or changing the third variable to a percentage of applications in a particular field of use which support the format.

Additionally, data for use in this formula, or additional variables for inclusion in this formula, can come from the file objects and format objects discussed above in regards to FIGS. 3 and 4. For example, if information was stored in file objects relating to the program which created the file, variables relating to the number or percentage of files in the format were created by particular programs can be used. Additionally, any of these alternates can be added to the existing formula instead of substituted, additional variables or coefficients can be added, or variables or coefficients can be removed. In some embodiments, one or more variables can be user-inputted values or a user can override determined variables. In another embodiment, a user can input the risk of expiration manually, bypassing any use of a formula.

Once a content repository evaluates the risk of expiration of the format at 706, the content repository compares that risk of expiration to one or more thresholds at 708. A content repository can have a single threshold value where a risk of expiration higher than or equal to the threshold indicates the format is expired and a risk of expiration lower than the threshold indicates the format is not expired. In such an embodiment, once a risk of expiration reaches or exceeds the threshold, a format will be marked expired, and the date of expiration will be added to the format object or the existing date in the format object (if any) can be changed. The date of expiration can correspond to the date the content repository determined the risk of expiration or other date as appropriate, such as the first date the risk of expiration would have exceeded the threshold based on historical data. In some embodiments, a risk of expiration exactly equal to the threshold can be treated as not expired.

In other embodiments, future dates of expiration can be estimated. This estimation can occur based upon the present risk of expiration and can also be based upon prior analyses of risk of expiration. For example, if a format's risk of expiration was assessed yearly with risk values of 60%, 70%, and 80% in three consecutive years and the content repository has a threshold of 90% before a determination that a format is expired, the content repository can estimate the format would be expired one year later. In another embodiment, a content repository can have more than one threshold, and these additional thresholds can be used to estimate a date of expiration in the future. For example, in a content repository using two thresholds if the risk of expiration reaches a first threshold, but not a second threshold, a format is determined to be expired at a set date in the future. Similar to the previous example, a content repository can determine that a format which has a risk of expiration of 80%, but not 90% can determine the format will expire in one year. More complicated systems for predicting future dates of expiration can also be employed, including machine learning models. In embodiments where future dates of expiration are estimated, a content repository can be scheduled to receive a format expiration check command at 704, at a time based on the estimated future date of expiration.

If the risk of expiration of a format is not above the threshold indicating it is not presently expired, the method ends at 720. If the risk of expiration of a format is above the threshold, the content repository identifies one or more files to convert from the expired format to an alternate format at 712. This can occur immediately upon determination that a format is expired, or at a later time. This also can be scheduled based upon a user inputted time or based upon the content repository's system usage. For example, the content repository can identify one or more files to convert at a time when the system has available CPU and/or memory to devote to the task. Identification of files to convert will vary in embodiments. Identification of files to convert can involve querying a record of associations between files and formats, such as a file-format map, and/or using format objects to determine which files are stored in the expired format. In some embodiments, all files in the expired format can be identified to convert from that format into another format.

In other embodiments, a subset of the files in the expired format can be identified for conversion. By not converting all of the files, a content repository can save system resources, including storage capacity, or power. The selection of which subset of the files in the expired format are identified for conversion can take many forms and can vary based on a content repository's requirements or can vary by format within a content repository. The selection can be based upon one or more dates associated with the files in the expired format. For example, in some embodiments, a content repository only identifies files for conversion which have been modified, accessed, or created within a specified time period, thereby targeting files which are more likely to be accessed in the future. In a content repository where information regarding the importance of files is stored, such as in the file objects corresponding to files, the identification process can be based on these importance values, and only files designated important would be identified for conversion. In a content repository where information regarding the expiration of individual files, not the formats, is stored, such as in the file objects corresponding to files, only files which are not expired may be identified for conversion. Other subsets can be identified by other entries in file objects or format objects including the various examples of optional entries discussed above regarding FIGS. 3 and 4. These examples of possible subsets and identification of files in the subsets is presented by way of example and is not meant to be comprehensive. Many possible subsets of files can be envisioned.

At 714, the content repository determines an alternate format to convert the identified files in the expired format to. This determination can be made when the format object is first created or otherwise occurs before a format is determined to be expired. For example, a suitable alternate format can be determined once the risk of expiration reaches a first threshold, but does not reach the threshold indicating it is expired. If a determination of an alternate format occurs before a format is determined to be expired, the content repository can use the previously determined value, can verify the previously determined alternate format is not itself expired before using it, or can determine an alternate format anew at that time. The content repository can prompt a user to input a compatible alternate format or can determine an alternate format automatically. This process can involve comparing the format object of the expired format and its entry for format profile, format library, or REST service with the other format objects in the content repository. It is possible there is not currently a compatible format in the content repository. In this event, a content repository can schedule additional checks or user prompts to determine an alternate format for the future until a compatible format is found.

It is also possible there will be multiple alternative formats which are compatible with the expired format. If this occurs, a content repository can prompt a user to select one of the compatible formats. Alternatively, the content repository can select one of the compatible formats. Various methods of selection of one of the compatible formats exist. One possible method is that the content repository ranks these alternative formats and selects the one with the highest score. This ranking can be based on multiple factors, similar to the evaluation of risk of expiration. The content repository can choose the format with the lowest current risk of expiration, the estimated date of expiration furthest in the future, or make a new determination based on any subset of the factors identified above regarding risk of expiration or additional factors such as functionality provided by a format, popularity of a format, vendor reputation of programs which support the format, or other considerations.

Once an alternate format is determined at 714, the content repository converts the files identified for conversion to the alternate format at 716. Like the identification of files to convert, this can occur immediately upon determination of an alternate format, or at a later time. This also can be scheduled based upon a user inputted time or based upon the content repository's system usage. For example, the content repository can perform the conversion at a time when the system has available CPU and/or memory to devote to the task.

At 718, the content repository saves the converted files in the alternate format. This saving can be a copy of the file, such that the original file remains unmodified, or it can be overwriting the original file, such that only the version in the alternate file remains. The saved file in the alternate format is a rendered file or a rendition, and information about the rendition can be stored in the file object for the original file, a new file object can be created for the rendition, or both.

A content repository can also create a notification or other output to be communicated to the user, administrator, or other person, or stored in a log or other repository of notifications. The notification can be provided by a daemon or process operating on the content repository. The notification can be constructed based on a notification engine or other subroutine designed to handle various input and react accordingly in an appropriate manner. This notification can include varying amounts of information in different embodiments, potentially indicating that one or more files were successfully converted, a listing of which files were successfully converted, that the files were saved in the alternate format, and/or the names of the files in the alternate format. For example, a content repository can email a user with any or all of this information. In a second example, a content repository can display a pop-up to an administrator notifying them of any or all of this information. An example pop-up can include information such as, but not limited to, a file name, the original format, and the converted format. After saving at 718 and any notification, method 700 ends at 720.

Figure 8:
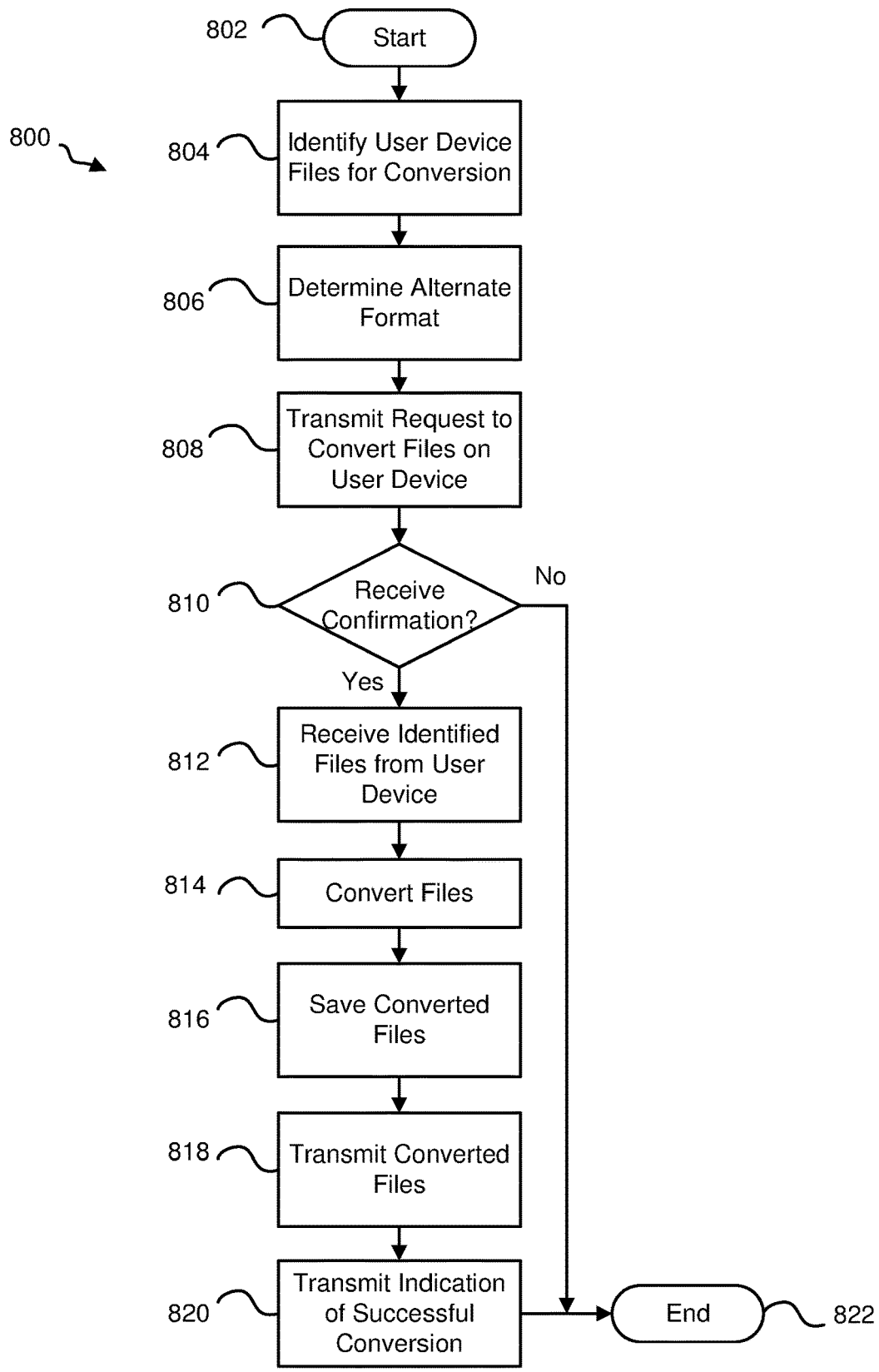
FIG. 8 depicts an example method for a content repository processing converting files on a user device to an alternate format, in accordance with embodiments of the present disclosure.

FIG. 8 depicts an example method 800 for a content repository processing converting files on a user device to an alternate format, in accordance with embodiments of the present disclosure. Method 800 can include more or less actions than those depicted. Method 800 can include actions in different orders than those depicted. Method 800 can be performed by a content repository such as depicted in FIG. 1 or FIG. 2 in communication with a user device such as depicted in FIG. 2.

Method 800 begins at start 802. Start 802 may be initiated by a user accessing a user interface on the user device and requesting method 800 be performed. Start 802 may additionally occur based on an automatic basis whether triggered by an event (including connection to the content repository), or triggered by scheduling. Before start 802, a content repository could previously have received one or more format expiration check commands, performed method 700, and in doing so, determined one or more formats were expired and which format to convert files to. Start 802 may be triggered by such an outcome of method 700 on the content repository. In order for there to be a match between formats between devices, in such a case, the content repository and user device will have a common set of format objects. The format objects may be stored entirely on the content repository, or be stored on both the content repository and user device. Additionally, there may be a single file-format map stored on the content repository mapping files from both the content repository and the user device, there may be separate file-format maps on the content repository and the user device, or some other arrangement may be employed.

Alternatively, method 800 could be preceded by operations similar to 702 through 710 of method 700, and upon determination of an expired format, proceeded to start 802.

In such case, user initiation may begin before these prior steps. These operations would be performed by the content repository using information stored on the user device, including file objects, format objects, and a file-format map.

At 804, the content repository identifies files on a user device for conversion from an expired format to an alternate format. The identification at 804 is analogous to operation 712 of method 700; however, in method 800, the files to be identified are located on a user device, not on the content repository itself. Identification of files to convert will vary in embodiments. Identification of files to convert can involve querying a record of associations between files and formats, such as a file-format map, and/or using format objects to determine which files are stored in the expired format. In some embodiments, all files in the expired format can be identified to convert from that format into another format. In other embodiments, a subset of the files in the expired format can be identified for conversion. For a discussion of some possible subsets, see above regarding operation 712 of method 700.

At 806, the content repository determines an alternate format to convert the identified files from the user device in the expired format to. This operation may be unnecessary if the content repository previously performed method 700 and identified an alternate format during that method. If that has not been done, this process will proceed and will be substantially the same as that described above for operation 714 of method 700. Any user prompts can be sent to the content repository, the user device, or both.

Once an alternate format is determined, the content repository transmits a request at 808 to convert the identified files on the user device. This request can be sent to the user device (including to a user interface on the user device), to an administrator, or to another suitable person or device. Various amounts of information may be included in this request ranging from a request to convert with no additional information, to a complete listing of all files to be converted, the formats the files are in, the formats to convert to, and any other relevant information.

At 810, the content repository checks to determine if it received confirmation of the request or if the request was denied. The content repository may have an allotted time limit for receiving a response. If no response is received within the allotted time, the content repository may either view this lack of response as confirmation of the request or denial of the request in various embodiments. Alternatively, the content repository may prompt an administrator to determine whether the lack of response should be viewed as confirmation of the request or denial of the request. If the request was denied, the method ends at 822.

If the content repository receives confirmation of the request, the content repository receives the identified files from the user device at 812. There may be an additional request for transfer of such files after the request to convert, or the request to convert may include within it a request for transfer of the files as well. These identified files may be transferred via any available method, including via local connection such as USB connection, or via a network such as network 200. This transfer can occur immediately upon receipt of confirmation of the request, or at a later time. This also can be scheduled based upon a user inputted time or based upon the content repository's system usage. For example, the content repository can perform the conversion at a time when the system has available CPU and/or memory to devote to the task. The transfer of files may include copying the files to the content repository, or moving the files from the user device such that a copy does not remain on the user device.

After receiving the identified files for conversion, the content repository converts the files to the alternate format at 814. Like the identification of files to convert, this can occur immediately upon determination of an alternate format, or at a later time. This also can be scheduled based upon a user inputted time or based upon the content repository's system usage. For example, the content repository can perform the conversion at a time when the system has available CPU and/or memory to devote to the task.

At 816, the content repository saves the converted files in the alternate format. This saving can be a copy of the file, such that the original file remains unmodified, or it can be overwriting the original file, such that only the version in the alternate file remains. The saved file in the alternate format is a rendered file or a rendition, and information about the rendition can be stored in the file object for the original file, a new file object can be created for the rendition, or both.

At 818, the content repository transmits the converted files to the user device. This can occur immediately upon conversion, or at a later time. This also can be scheduled based upon a user inputted time or based upon the content repository's system usage. For example, the content repository can perform the transmission at a time when the content repository, the user device, or both has available CPU and/or memory to devote to the task. This transfer may occur as the reverse of the transfer at 812. Operations 816 and 818 may be combined such that the converted files are not saved on the content repository before transfer, but rather the data to be saved as a rendition file is transferred to the user device for saving on that device.

At 820, the content repository transmits an indication of successful conversion. This can take the form of a notification or other output and be communicated to the user device (including to a user interface on the user device), the user, an administrator, or other person, or stored in a log or other repository of notifications. The notification can be provided by a daemon or process operating on the content repository. The notification can be constructed based on a notification engine or other subroutine designed to handle various input and react accordingly in an appropriate manner. This notification can include varying amounts of information in different embodiments, potentially indicating that one or more files were successfully converted, a listing of which files were successfully converted, that the files were saved in the alternate format, and/or the names of the files in the alternate format. For example, a content repository can email a user with any or all of this information. In a second example, a content repository can send a message to appear on a user interface on the user device notifying a user of any or all of this information. An example message to appear on a user interface can include information such as, but not limited to, a file name, the original format, and the converted format. After transmitting this indication at 820, method 800 ends at 822.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for file conversion upon format expiration, the system comprising:
   one or more processors; and a memory communicatively coupled to the one or more processors, wherein the memory comprises instructions which, when executed by the one or more processors, cause the one or more processors to perform a method comprising:

receiving, by a computing system and based upon a first schedule, a command to perform a format expiration check;

evaluating, by the computing system, a risk of expiration of a first format associated with a first format object, wherein the first format object contains information which allows the computing system to analyze respective content of respective files in the first format, and the evaluating includes evaluating a market share of one or more applications that support the first format, evaluating a release frequency of one or more applications that support the first format, and evaluating a number of applications that support the first format;

determining, by the computing system, if the risk of expiration is above a threshold;

identifying, by the computing system by querying a record of associations comprised of key-value pairs between files and formats using format objects and in response to determining the risk of expiration is above the threshold, one or more files stored in the first format for conversion by selecting a subset of the files stored in the first format based on one or more importance values associated with the files;

identifying, by the computing system, a second format based on information stored in the first format object and information stored in a second format object associated with the second format;

converting, by the computing system and on a second schedule automatically selected by the computing system based upon system usage, one or more files stored in the first format to the second format;

saving, by the computing system, the one or more files in the second format by overwriting the one or more files stored in the first format; and outputting, to a user interface, an indication that the one or more files were successfully converted and saved in the second format, and the indication comprises, for respective successfully converted and saved files, a respective file name, the first format, and the second format.

\* \* \* \* \*